(12) United States Patent
Cole et al.

(10) Patent No.: US 7,630,871 B2
(45) Date of Patent: Dec. 8, 2009

(54) CRUSH MODELLING

(75) Inventors: Ian Cole, Sompting (GB); Graham Barnes, Dormansland Lingfield (GB); Richard Roberts, Henfield (GB); James Anderson, Brighton (GB)

(73) Assignee: Engenuity Limited, West Sussex (GB)

( * ) Notice: Subject to any disclaimer, the term of this patent is extended or adjusted under 35 U.S.C. 154(b) by 504 days.

(21) Appl. No.: 10/931,273

(22) Filed: Aug. 31, 2004

(65) Prior Publication Data

US 2006/0004550 A1 Jan. 5, 2006

(30) Foreign Application Priority Data

Jul. 2, 2004 (GB) ................... 0414992.8

(51) Int. Cl.
G06F 7/60 (2006.01)
G06F 19/00 (2006.01)
G06G 7/48 (2006.01)

(52) U.S. Cl. ............... 703/8; 703/7; 703/2; 700/98; 700/146

(58) Field of Classification Search ........... 703/8, 703/2, 7; 364/472, 578
See application file for complete search history.

(56) References Cited

U.S. PATENT DOCUMENTS

| | | | |
|---|---|---|---|
| 5,390,127 A * | 2/1995 | Tang et al. | 700/146 |
| 5,625,575 A * | 4/1997 | Goyal et al. | 703/6 |
| 5,729,463 A * | 3/1998 | Koenig et al. | 700/98 |
| 6,195,625 B1 * | 2/2001 | Day et al. | 703/7 |

OTHER PUBLICATIONS

Mamalis et al. "Crushing of Hybrid Square Sandwich Composite Vehicle Hollow Bodyshells with Reinforced Core Subjected to Axial Loading: Numerical Simulation" May 2003. Composite Structures: 175-186.*
Johnson et al. "Computational Methods for Predicting Impact Damage in Composite Structures". Composites Science and Technology 2001: 2183-2192.*
"LS-DYNA User's Manual: Nonlinear Dynamic Analysis of Structures" May 1999.*
Palazotto et al. "Finite Element Analysis of Low-Velocity Impact on Composite Sandwich Plates" 2000.*
MSC.Dytran "User's Manual" Version 4.7: 1997. pp. 1-1, 1-2, 2-20:2-22.*
Belingardi et al. "Numerical Simulation of Fragmentation of Composite Material Plates Due to Impact" Int. J. Impact Engng vol. 21, No. 5: 1998.*

(Continued)

*Primary Examiner*—Kamini S Shah
*Assistant Examiner*—Shambhavi Patel
(74) *Attorney, Agent, or Firm*—Ohlandt, Greeley, Ruggiero & Perle, L.L.P.

(57) ABSTRACT

A method of determining the impact resistance of a structure including a crushable material comprises the steps of determining for one or more layers of a finite element of said material during an impact whether said element or layer thereof is to be treated as failing by crushing. If the element or layer is determined to fail by crushing, a load-bearing portion of the structure is defined and the load-bearing portion is treated for the purpose of subsequent calculations as exhibiting an ongoing resistance.

39 Claims, 6 Drawing Sheets

OTHER PUBLICATIONS

Christoforou, Andreas. "Impact Dynamics and Damage in Composite Structures" Composite Structures 2001.*

Johnson, et al. "Computational Methods for Predicting Impact Damage in Composite Structures", Composites Science and Technology, 2001.*

Li, et al. "Low-Velocity Impact-Induced Damage of Continuous Fiber-Reinforced Composite Laminates. Part I. An FEM Numerical Model", Composites: Part A 2002.*

K. Schweizerhof et al., "Composite crash elements for energy absorption in frontal crash situations," VDI Report No. 1007, pp. 523-545, 1992 (with translation).

* cited by examiner

CRUSH MODELLING

FIELD OF THE INVENTION

This invention relates to methods, apparatus and software for modelling the behaviour of materials which are crushed particularly, but not exclusively, in the context of composite vehicle body parts under impact.

BACKGROUND

It has been recognised for a long time that fiber-reinforced composite materials, particularly carbon fiber composites have great potential for revolutionising the auto industry. It is well known that composites are very light compared to their metal equivalents, even aluminium, and can be formed into complex shapes that can do the same job as many welded metal stampings.

Composites also have the ability to absorb high amounts of energy during impacts which make them ideal for automotive, rail or civil applications. For example, whereas steel can only absorb up to 20 kilojoules per kilogramme and aluminium approximately 30 kilojoules per kilogramme, carbon composites can absorb up to 80 kilojoules per kilogramme.

In addition, unlike metallic structures, the crushed material has very little residual strength after it has absorbed the energy. Instead, the composite material is essentially transformed into small pieces of debris and loosely connected fibres after it has been crushed which means that less space is required than in an equivalent metal structure. This is because in a metal structure space must be provided in designated crumple zones to accommodate the buckled metal.

There is, therefore, a significant incentive to using composite materials such as carbon fiber composites in mass production vehicles. However, to date they have only been used in very limited applications such as top-end sports cars, motor sport and small, non-critical parts of mass produced cars.

Two significant current disadvantages of composites is that they are relatively costly and have long manufacturing cycle times. However, a significant barrier which still remains to their widespread use in the automotive industry is the ability to be able to model their performance in an impact. This is of course essential to be able to do in order to design vehicles which are as safe as possible and which will behave in a predictable way in the event of a crash. Although crash performance testing can be carried out by building prototypes, this is extremely expensive and is only practically feasible in the latter stages of design to prove the basic design and calibrate restraint systems. During the earlier stages of design of vehicles made from metal, finite element analysis is used to model the behaviour and interaction of the various metal parts and to predict their performance in the event of an impact. This means that designs can be proposed, tested and modified using computer modelling with much less reliance on producing and testing expensive prototypes.

However, this approach does not currently work for crushable materials such as composites. The reason for this is that composites absorb energy by a very different mechanism to metallic structures. Metallic structures absorb energy by plastic folding of the metal, initiated by local buckling of the material, which can be characterised by a stress vs strain curve to good effect. At limit, final failure, which may be tearing or brittle fracture, results in the element being unable to transfer load, although its initial volume is essential unchanged.

On the microscopic scale however some materials such as composites absorb energy by local crushing of the material, by matrix cracking, fiber buckling and fracture, frictional heating etc. Viewed on a macro scale, the material is essentially crushed or consumed by the impact on a continuous basis, and the volume of the material is reduced as the structural material is turned to debris.

It is widely recognised in the art that no satisfactory way of modelling the crush performance of composite materials exists. Existing finite element analysis techniques tend to treat elements of composite by treating the whole element or separate layers thereof as maintaining their integrity until the appropriate failure stress value is reached, whereafter the element or layer is simply deleted from the analysis or the element or layer is deleted from the analysis in a predefined period. In a typical example, this might result in the element being deleted with only 5% of its original edge length compressed. The conventional finite element calculations essentially cannot deal with very large changes in volume and therefore catastrophically fail the element where in reality the unimpinged volume of material still had a significant capacity to absorb energy. This has the effect that the results of analysis based on such techniques do not correlate satisfactorily with actual experimental results such that they cannot be relied upon to predict the performance of structures e.g. automotives in the event of an impact.

This is clearly a serious drawback of conventional techniques and in practice means that composite materials are not used or in the few cases where they are used, either the structure must be sufficiently over-engineered to ensure the required minimum level of performance, or extensive prototyping and testing is needed in order to assess performance, which is of course unduly time consuming and expensive.

There exists a need, therefore, to be able to predict reliably the performance of composite materials during an impact.

SUMMARY OF THE INVENTION

When viewed from a first aspect the present invention provides a method of determining the impact resistance of a structure including a crushable material comprising the steps of determining for one or more layers of a finite element of said material during an impact whether said element or layer thereof is to be treated as failing by crushing; and if said element or layer is determined so to fail, defining a load-bearing portion of the structure and treating said load-bearing portion for the purpose of subsequent calculations as exhibiting an ongoing resistance.

When viewed from a second aspect the invention provides computer software which, when executed on suitable data processing means, determines the impact resistance of a structure including a crushable material by determining for one or more layers of a finite element of said material during an impact whether said element or layer thereof is to be treated as failing by crushing and if said element or layer is determined so to fail, defining a load-bearing portion of the structure and treating said load-bearing portion for the purpose of subsequent calculations as exhibiting a ongoing resistance.

When viewed from a further aspect the invention provides a data processing apparatus programmed to determine the impact resistance of a structure including a crushable material, by determining for one or more layers of a finite element of said material during an impact whether said element or layer thereof is to be treated as failing by crushing and if said element or layer is determined so to fail, defining a load-bearing portion of the structure and treating said load-bearing portion for the purpose of subsequent calculations as exhibiting an ongoing resistance.

The inventors have recognised that the actual failure mode of crushable materials during crush can be approximated as giving an ongoing resistance throughout the continuous consumption of the element or layer at the crush front rather than letting the element or layer as a whole suffer a single rapid failure.

The inventors have realised that the approach in accordance with the invention gives much more reliable and accurate results in circumstances where a material undergoes crush.

It should be appreciated that in general the resistive force returned for the element or layer is not the peak failure stress but is a somewhat lower value which may be calculated from materials theory or determined empirically. To give one specific example, for a typical high strength carbon composite such as T300 in a toughened resin system the compressive failure stress is of the order of 600 Newtons per square millimeter ($N/mm^2$). However, if the material is crushed continually, the resistance to the impactor is of the order of 100 $N/mm^2$ i.e. approximately $\frac{1}{6}$ of the peak compression strength value.

The invention therefore effectively adds a new failure mode for elements which are determined to be those which in reality will undergo crush—i.e. return a resistance force throughout the consumed length of the element. The crush front may simply be the forward face of the barrier impacting the structure although this is not essential and the crush front could instead be defined elsewhere—e.g. in a fixed relationship relative to the barrier.

The element or layer which is determined to be failing by crushing could be deleted, the ongoing resistance being applied to one or more elements or layers adjacent the deleted element or layer, and/or another load bearing portion of the structure. Preferably the load bearing portion is a portion of the element or layer being crushed itself. For example the element or layer could be resized or redefined (e.g. by splitting), the ongoing resistance being distributed across the or each new element or layer. In both of the foregoing alternatives the barrier is effectively treated as being impenetratable (save possibly for an allowance for minimal penetration to avoid computation difficulties at the boundary). The nodes of the element or layer adjacent to the barrier are therefore prevented from passing through. However both possibilities are to be contrasted with conventional finite element in which analysis rigid barriers are effectively treated as impenetratable and analysis elements or layers are simply compressed against the barrier until the failure stress is reached and the element or layer is deleted with no residual effect.

In presently preferred embodiments of the invention the crush front is allowed to progress across the element or layer so that the space occupied by the element or layer "passes through" the crush front.

The resistance will not in general be a fixed value but rather may be a function of one or more parameters relating to the element or layer. In a preferred example the resistance is a function of the thickness of the element or layer being crushed along the crush front. Additionally or alternatively the resistance is preferably dependent upon the contact area at the crush front. Preferably for a given element the actual value of the resistance force is a constant function of the contact area. In the simplest case the resistance force could be directly proportional to the contact area although this is not essential. Additionally or alternatively where the crushable material is a composite material, the resistance may be determined as a function of the lay-up of the layers of the composite, e.g. the order of the layers.

Furthermore in presently preferred embodiments of the invention the crush resistance is also a function of one or more dynamic parameters relating to the impact such as the velocity and/or angle with which the impactor strikes the element or layer in question or the amount of rotation imparted to it.

The variations with element/layer and/or dynamic parameters may be determined by theory, empirically or both. Even if these variations are determined theoretically, this does not imply that the corresponding base value is so determined and vice versa. In practice it is expected that at least the variation of crush resistance with angle will be empirically determined since this is very dependent upon the weave of a layer or on each of the layers of a composite material.

Preferably a set of finite elements of the structure is designated as being susceptible to crush. The set could comprise all of the elements in the structure. However the Applicant has realised from empirical experience that only a relatively small zone of a composites structure in the immediate vicinity of an impactor will undergo crash. In preferred embodiments therefore only a subset of elements is designated as being susceptible to crush, thereby defining a crush zone. These elements are thus allowed to fail through the novel crushing mode of the present invention and will therefore require data allowing their resistance in this failure mode to be calculated. Elements outside the crush zone will not have the option of failing by crush. However this means that it is not necessary to establish data allowing their failure resistance to be determined. Clearly this is beneficial where empirical data is used to measure the resistance exhibited during crush since it obviates the need to establish data for areas outside the crush zone.

When it is determined in accordance with the invention that a particular finite element is in the crush regime, the conventional finite element analysis could simply be suspended in favour of the novel crush failure mode set out herein—in other words the conventional finite element analysis calculations would simply not be carried out for the particular element or layer. In at least some preferred embodiments however the conventional finite element calculations are also carried out in parallel so that analysis reverts to these in the event that at any the element is calculated to have failed due to another, conventional failure mode such as shear, tensile or inter-laminar failure at any point whilst the element is being crushed. To give one example if the crush resistance force gives rise to very large bending forces an element might then fail as a result of tensile stress rather than being crushed.

If the force pushing an element through the crush front is not sufficient to overcome the resistive force calculated in accordance with this invention the element can effectively can move back into conventional finite element analysis. It should be appreciated however that the element could again pass through the crush front at a later stage as dictated by the finite element analysis calculations.

Where analysis reverts to the conventional finite element calculations the element or layer in question may be deemed thereafter not to be capable of being crushed or to have a degraded crush capability. For example the resistance force of the element or layer in question might be reduced, for the purposes of any future crush, in proportion to the amount of it which had previously been 'consumed' during the previous crush phase.

Where, as is preferred, the load bearing portion is a portion of the element or layer being crushed itself, the load bearing portion could be the whole element or layer, i.e. the resistance force could conceivably be applied as a distributed force across the element or layer. However for consistency with normal finite element analysis it is preferred to apply the force to the individual nodes of the element so that the nodes comprise the load bearing portion. In some embodiments the force is divided equally between the nodes. In other embodiments the force may be biased towards one or more of the nodes. The force is preferably divided between nodes that have passed through the crush front and nodes that have not in proportions according to the amount of the element by area or penetration distance that has passed through the crush front. To give an example, if 70% of the element had passed through the crush front, 70% of the calculated force would be applied to the nodes that had not yet passed through.

The crush resistance which the element or layer will be treated as offering may, as mentioned above, be determined using materials theory. However, the internal mechanisms at work during crush are often highly complex. For example in fiber composite materials they depend on inter alia fiber type and sizing, the resin properties, the cure cycle and the weave style. This complexity is one reason why attempts to model crush in the past have failed. However, one of the strengths of the present invention is that it is not necessary to calculate or even understand the internal mechanisms responsible since it has been appreciated that for a given set of macroscopic conditions (area of contact with impactor, velocity, angle of impact etc.) the crush resistance may be approximated to a single macroscopic value. This value may therefore be obtained empirically by performing tests on small samples (known in the art as "coupons") of the material in question which thereafter allows it to be modelled in large, complex structures.

In accordance with the invention an element comprising the entire material thickness could be modelled together or, where the material comprises layers each layer or sub-group of layers could be modelled separately.

In accordance with the invention, a determination is made for analysis elements or layers as to whether or not they are to be treated as undergoing crush. In embodiments preferred for simplicity the determination is made by deciding whether the impactor barrier has physically encroached into the space allocated to a given element or vice versa. In terms of the model this amounts to deciding whether any of the element's nodes have "passed through" the barrier or in other embodiments a crush front defined in another region of the model space. If failure of the element through a conventional failure mode has not already taken place, and the supporting structure has not collapsed, it may then be deduced that the element will undergo crush. In alternative embodiments an explicit calculation is made of the stress or strain on the element which is compared with a threshold failure value. The element is therefore denoted as being crushed if this threshold value is exceeded. However the determination is made if an element is determined to be undergoing crush, the treatment in accordance with the invention is applied.

It will be appreciated that the ability in accordance with the invention to model the behaviour of materials being crushed does not, as has been previously attempted, require drastically reducing the size of the finite elements used in the model which would in any event lead to an inordinately large time or computing power requirement. Rather a practical advantage of using an essentially continuous model of the crush force, as the methods of the present invention may be seen, is to allow element sizes which are the same order of size as would be employed for an equivalent analysis of a metal structure. This is because when an element has been forced into the crush regime, as determined in accordance with the invention, and providing the structure supporting the element in question is capable of withstanding the forces involved, its edge length is no longer compressed against the wall of the impactor or other crush front but is effectively permitted to pass through, subject, of course, to the resistive force on the wall that the projected edge length, thickness and crush resistance stress etc. dictate.

Although in many cases where the principles of the invention are applied the impactor will be a rigid solid object striking the structure, this is not essential and the impactor could comprise another part or body of the structure with sufficient strength and rigidity.

In presently preferred embodiments shell elements are employed although alternatively solid or beam or other elements could be used.

In some embodiments it may be preferred, e.g. for reasons of computational efficiency, that the relative velocity of the impactor wall or crush front and the element in question is taken to be constant during consumption of the element. However, this is not essential and preferably the relative velocity is adjusted during the passage of the crush front through the element. Preferably the resistive force is modified along the length of the element in accordance with a predetermined function of the relative velocity.

The same considerations apply to angle dependence to allow for rotation during consumption of the element. Indeed in general any parameter on which the crush resistance depends may be updated during consumption of the element, another example being the thickness, vibration, temperature etc.

In some preferred embodiments the friction of the crush interface with the barrier or other crush front may be specified. This is advantageous as it can influence whether a given element is stable enough to undergo crush or whether it fails by another mechanism.

Modelling of the effect of an impact of a structure including a crushable materials in accordance with the invention may be carried out without taking damping into account. In some preferred embodiments however damping coefficients are specified which could be internal, external or specified globally by the overall finite element analysis model.

The invention may be applied to any material which can be crushed, i.e. one which disintegrates with little or no residual strength under certain conditions. Some possible and non-limiting examples include concrete, wood, glasses, ceramics, honeycombs and foams. In preferred embodiments of the invention the crushable material comprises a composite material, more preferably a reinforced-reinforced composite material and most preferably a carbon-fiber reinforced resin.

Although the principles of the invention may be widely applied, e.g. as part of an original analysis model, preferably software implementing the invention is incorporated into an existing finite element modelling package. The type of finite element modelling is preferably non-linear and could be implicit, explicit or another type of analysis mathematics, although explicit non-linear analysis is preferred. In the currently preferred embodiment for example, the software is incorporated into MSC.Dytran (trade mark) explicit non-linear finite element analysis software.

BRIEF DESCRIPTION OF THE DRAWINGS

A preferred embodiment of the present invention will now be described, by way of example only, with reference to the accompanying drawings in which.

DETAILED DESCRIPTION OF PREFERRED EMBODIMENTS

Figure 1:
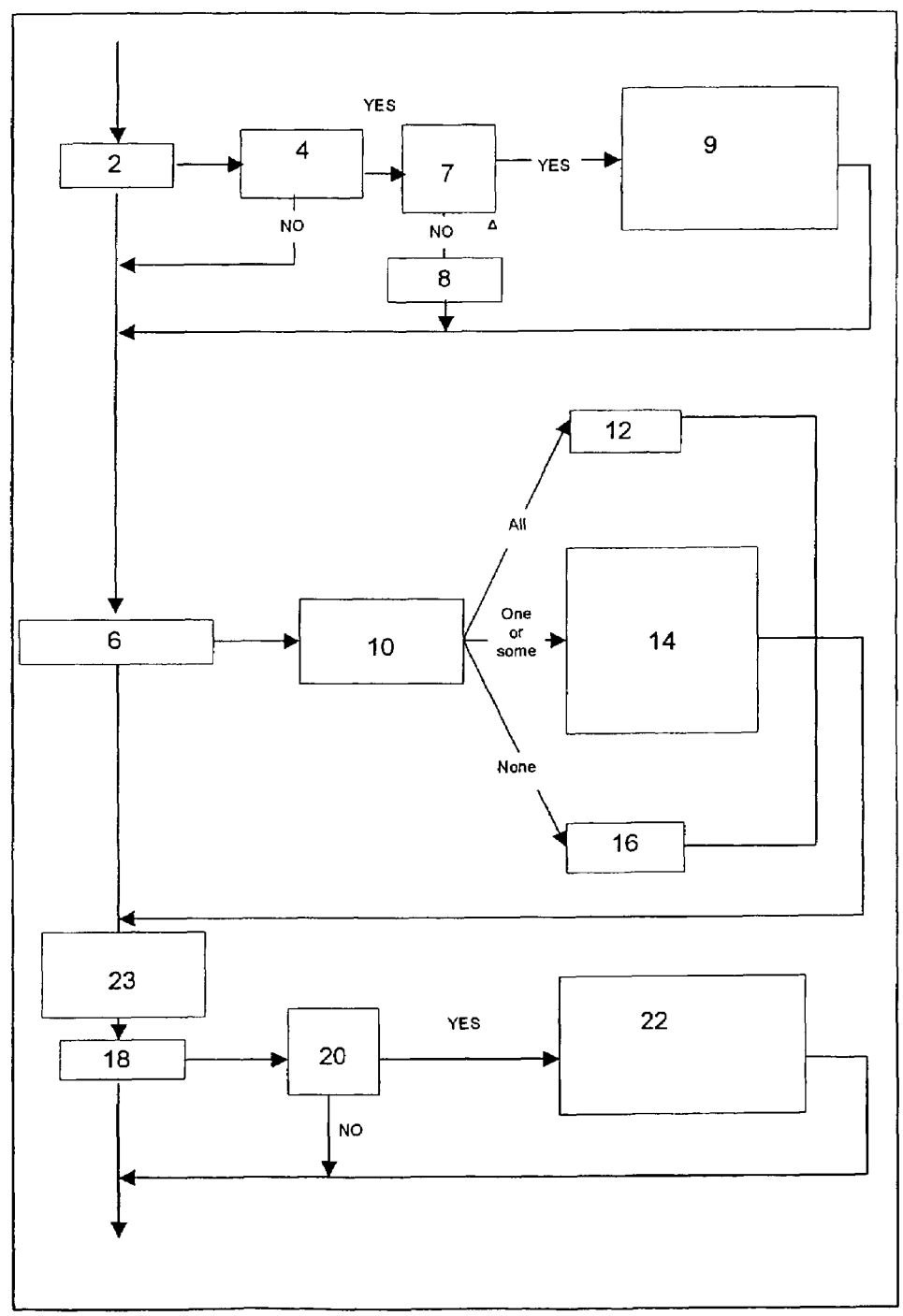
FIG. 1 is a schematic flowchart showing the operation of software embodying the present invention.

In a preferred embodiment of the invention, software operating in accordance with the principles of the invention is incorporated into MSC.Dytran (trade mark) 2004 finite element analysis package which is available from MSC. Software Inc. This known software can be programmed with failure stress values for composite materials and thus for a given finite element of the material can attempt to model the forces on that element until the stress it experiences exceeds the failure stress whereupon the element is deleted. However, in the embodiment of the invention now being described, this part of the functionality of the software is supplemented. Instead, the process shown in FIG. 1 is followed.

In this process, it is first determined, at 2, when there is impact between the defined impactor and an element selected as being capable of crush of the structure. If there is contact, it is determined, at 4, whether any of the nodes of the element have penetrated the impactor. If none of the nodes has penetrated the impactor, the software moves to the next main step at 6 in which the element stress is updated. However, if penetration is detected, the software moves, at 7, to assess whether the element connected to the node is already tagged as undergoing crush. If it is not the software adds this tag to the node at 8 and then moves on to update the element stress at 6. If the element connected to the node had already been tagged as undergoing crush though, a further series of sub-routines is carried out first at 9. Firstly the contact force is set to zero. Secondly the direction of crush is stored and lastly the relative velocity is stored.

The next main step at 6 is to update the stress on the element. To do this it is determined, at 10, how many of the nodes of the element have been tagged as undergoing crush. If all of the nodes of the element have been tagged, the element is taken to have failed and is therefore removed from further calculations at 12. If one or more, but not all of the nodes is tagged, the software, at 14, projects the crushing direction in the element co-ordinate system to allow determination of the correct direction for material properties to be calculated. It then determines the resistance stress of the element from input data (explained in greater detail below with reference to FIG. 2) and the whole element is tagged as undergoing crush.

Alternatively, if at the assessment step 10 none of the nodes is tagged as undergoing crush, the system simply does nothing, at 16. Whichever of the possibilities 12, 14, 16 is encountered, the software then moves to 23 where the conventional finite element stress update is undertaken prior to moving on to the third main step of the process in which crushing contact is calculated, at 18.

In this stage, a determination is made, at 20, as to whether the element has been tagged as undergoing crush. If the element has not been tagged, processing continues within the previous conventional analysis mode before returning to the beginning of the process shown in FIG. 1.

However, if the element has been tagged, four actions are taken. Firstly, the intersection between the element and the impactor is calculated. The intersection is calculated to determine the amount of material being crushed. If a triangle is crushed from a vertex, the material being crushed will increase and, as a result, the resistive force will increase as the element is consumed through the barrier. Secondly, the crush direction is obtained, thirdly the crush stress is obtained and finally the crush forces are calculated Thereafter, processing continues within the previous conventional analysis mode before returning to the beginning of the process shown in FIG. 1.

Figure 2:
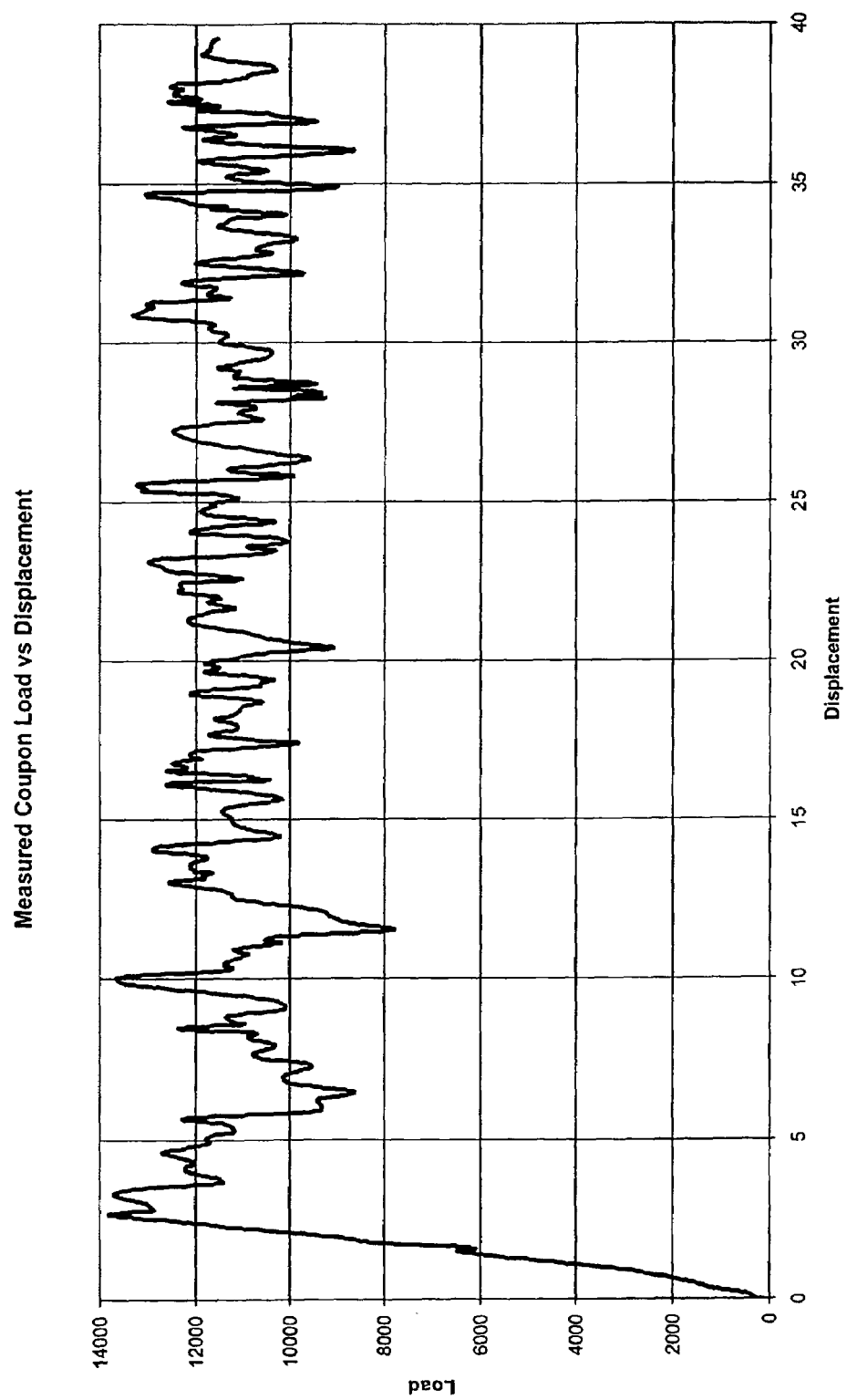
FIG. 2 is a graph showing resistive force against deflection for a test coupon of a composite material.

In order to calculate the predetermined resistance to be fed into the model described above, a small coupon of the relevant composite material is subjected to a crush test. In one example, material sections of 60×30 mm are cut from flat plates and bonded to a 50 mm thick honeycomb sandwich in order to promote stabilized crush. The outer edges of each skin presented to the impactor are chamfered at approximately 60° to present a sharp edge to minimize the spike in crush resistance exhibited at the start of crushing and thereby minimize the risk of deamination from the honeycomb at the start of crushing where the initial failure corresponds to the compressive failure performance of the element. The honeycomb cells are oriented perpendicular to the direction of coupon crush and therefore do not absorb significant energy but ensure that the skins do not buckle. A typical plot of resistance force exhibited by a coupon versus deflection (i.e. the amount of the coupon which has been crushed) is shown in FIG. 2. From this it will be seen that throughout most of the range of deflection the force is relatively constant. By taking a suitable average value for this, the resistance force to be used in the analysis model for a particular material may be determined. Since the coupon has a constant cross-sectional area, there is no variation of the resistance force with contact area. However in the model the actual value of the resistance force is calculated as directly proportional to the contact length.

It will be appreciated that this method of coupon testing provides a low cost way of determining the stabilized crush properties for a wide variety of lay-ups configurations and angles. Thus typically such tests would be conducted for each of the material constructions used in the structure to be modelled as crush capable, and optionally each at a range of angles.

Figure 3:
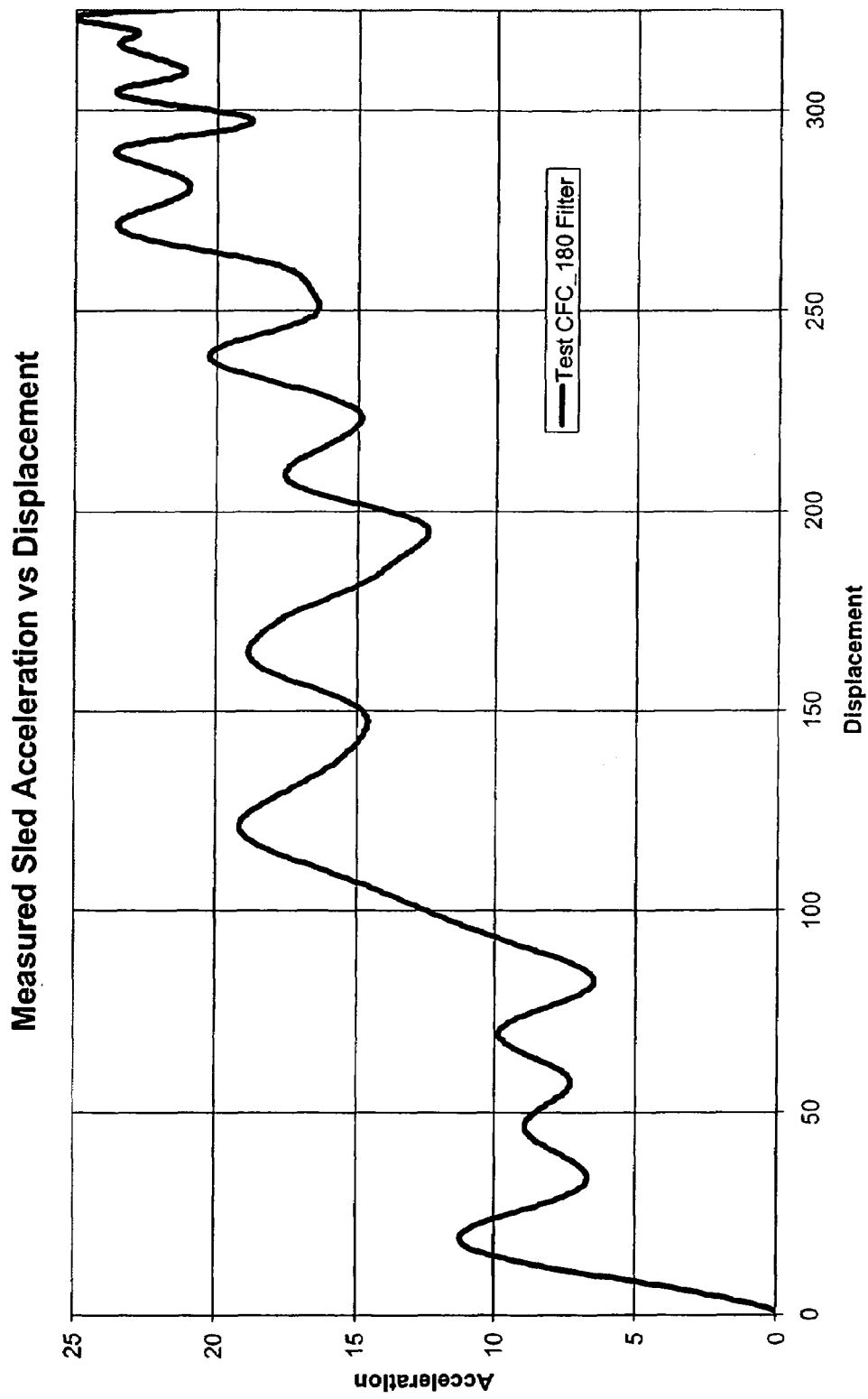
FIG. 3 is a graph of deceleration against time for a test cone which underwent an impact under controlled conditions.
Figure 4:
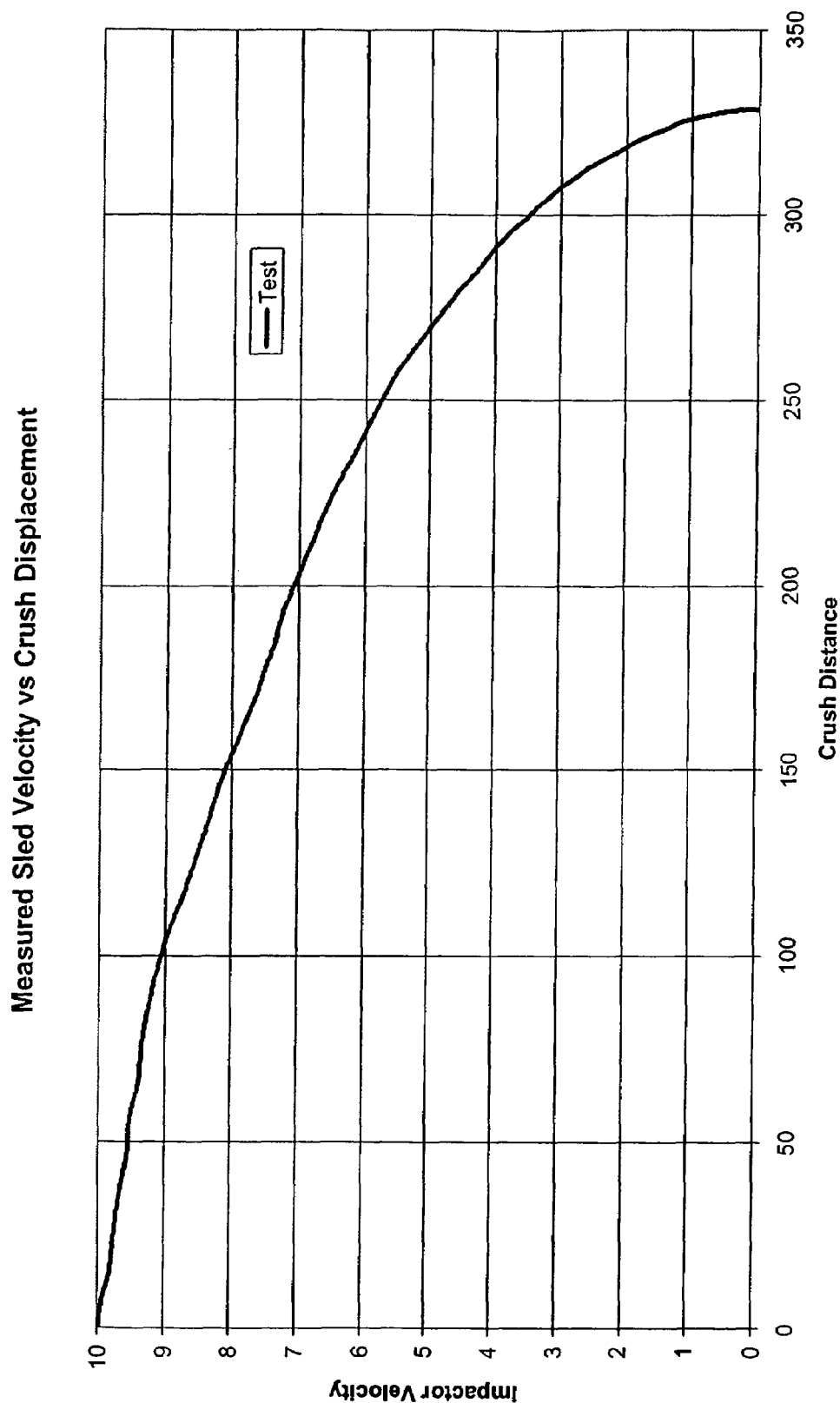
FIG. 4 shows the sled velocity versus displacement for the experiment of FIG. 3.

In an exemplary application of the embodiment described, a rectangular-section cone structure of a T300 carbon fibre composite material approximately 85×115 mm in section and approximately 455 mm long was mounted on a rigid barrier and a rigid sled is propelled at a controlled velocity into the cone. FIG. 3 shows the measured deceleration of the trolley versus displacement filtered using a Butterworth Order4 low pass filter with upper cut-off frequency of 300 Hz in this experiment (impact occurring at Displacement=0). From this the actual resistance force encountered may be calculated simply from the deceleration of the trolley and its mass. FIG. 4 shows the sled velocity versus displacement for the same experiment.

Figure 5:
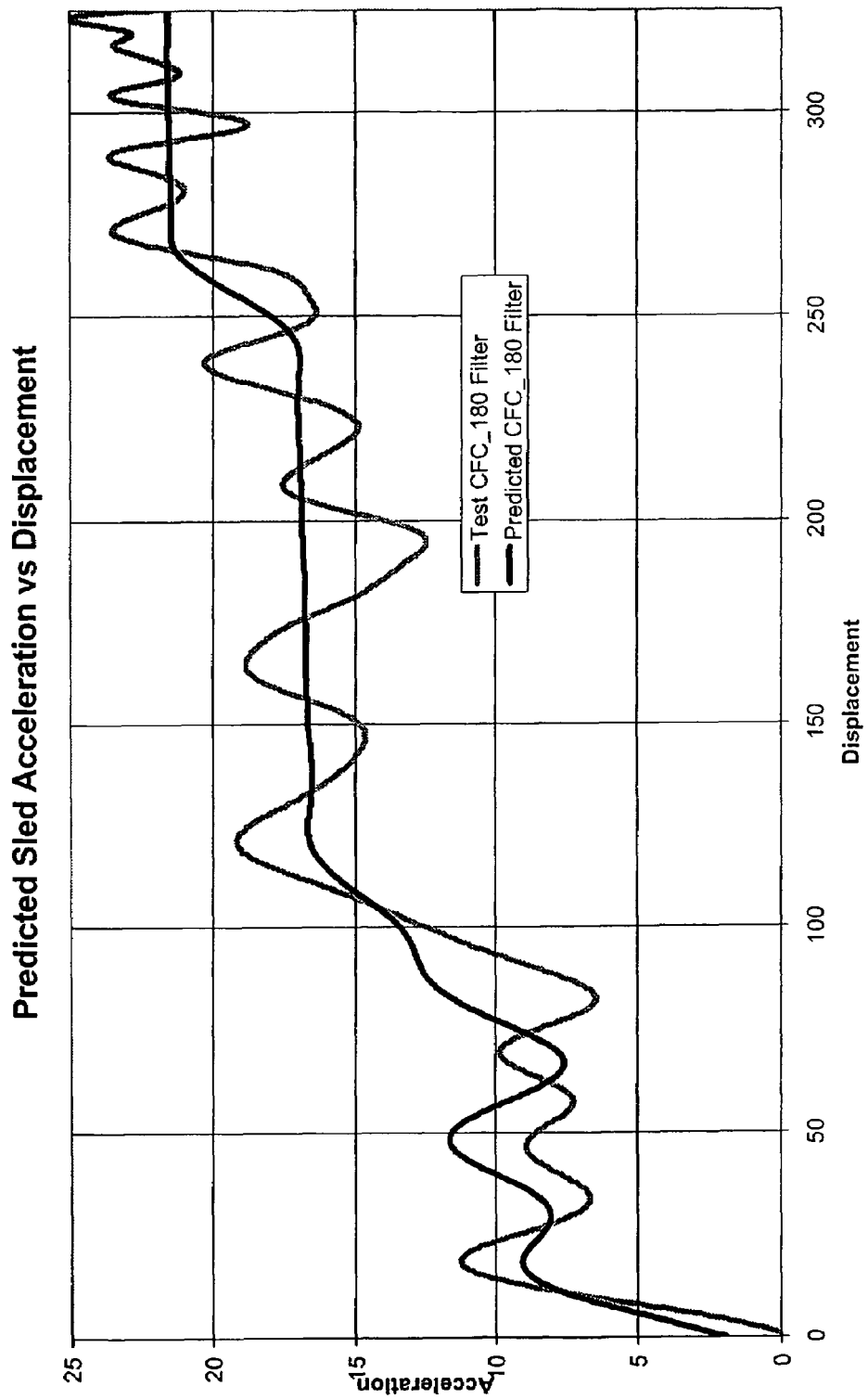
FIG. 5 shows the predicted deceleration profile is shown in FIG. 5.
Figure 6:
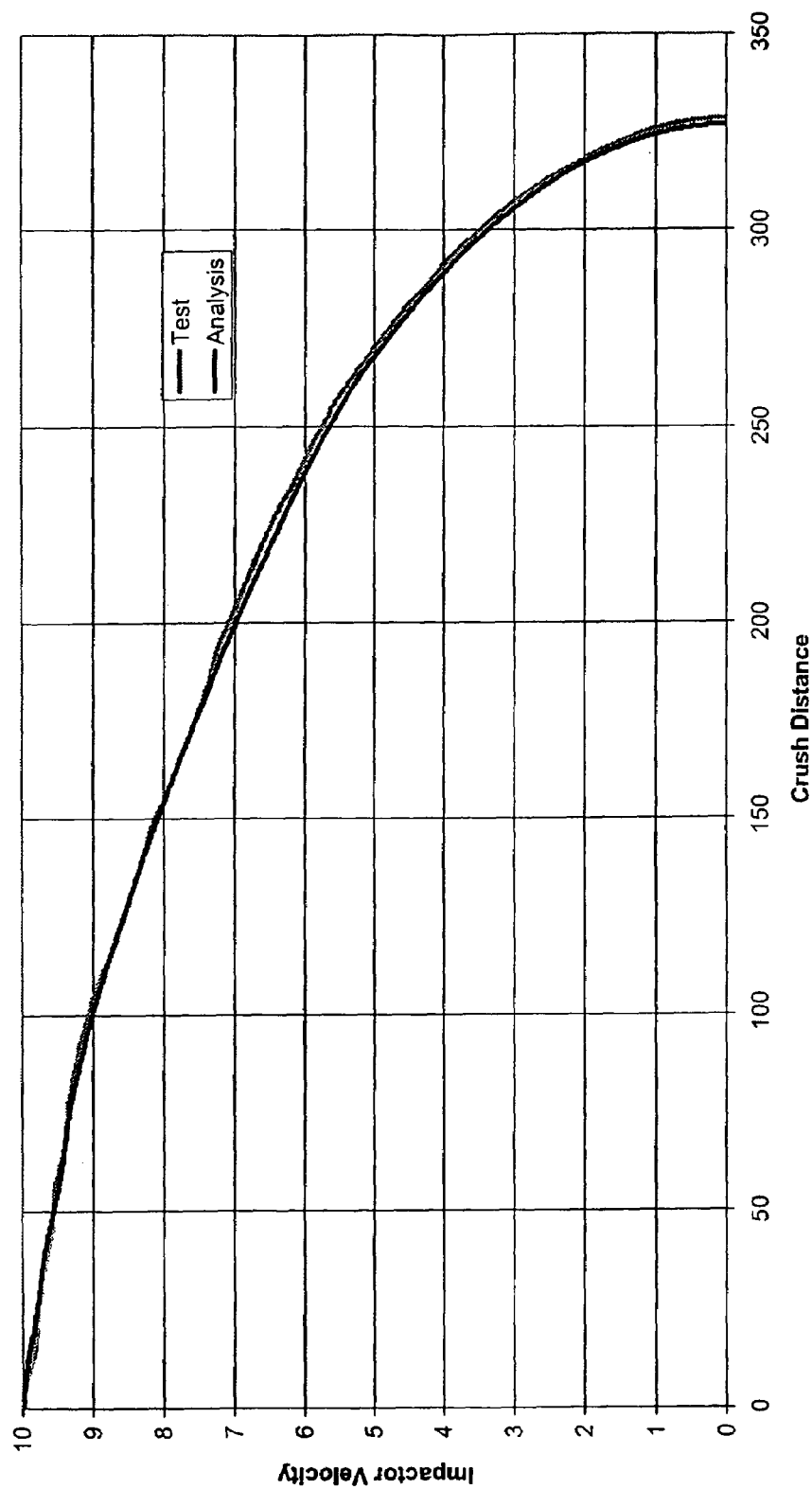
FIG. 6 shows the predicted sled velocity.

The cone was modelled using Dytran 2004 software modified as described above with reference to FIG. 1. The predicted deceleration profile is shown in FIG. 5 filtered in the same manner as the test results, using a Butterworth Order4 low pass filter with upper cut-off frequency of 300 Hz. From this it will be seen that the profiles and absolute values of the deceleration are similar. FIG. 6 shows the predicted sled velocity and here a remarkable similarity exists between the tested and predicted results. For example, the prediction of the distance taken to bring the trolley to a rest was predicted at 327 mm and was measured at 328 mm meaning that the prediction was accurate to within 1% percent. This is much more accurate than could be achieved with the prior art methods.

The invention claimed is:

1. A method of modelling the behaviour of a structure during an impact, said structure incorporating a material which can fail through a crush failure mode whereby said material is continuously consumed in a crush direction by disintegrating into debris, the method comprising the steps of determining for one or more layers of a finite element of said material during said impact whether said element or layer thereof is failing by said crush failure mode; and if said element or layer is determined to be failing by said crush failure mode, defining a crush front or barrier and allowing the element or layer to pass through said crush front or barrier whilst being crushed, and assigning to a portion of the structure an ongoing resistance in the crush direction as the element or layer passes through the barrier, and using said model to output data from which a predicted impact resistance of said structure can be calculated.

2. A method as claimed in claim 1 wherein said portion comprises a portion of said element or layer.

3. A method as claimed in claim 2 comprising applying said ongoing resistance to individual nodes of the element or layer so that said portion comprises said nodes.

4. A method as claimed in claim 3 comprising:
defining a crush front or barrier and allowing said element or layer to pass through said crush front or barrier whilst being crushed; and
dividing said ongoing resistance by allocating a first percentage of said ongoing resistance to a first set of nodes that have passed through the crush front or barrier and a second percentage of said ongoing resistance to a second set of nodes that have not passed through the crush front or barrier, wherein said first and second percentages are calculated either as a function of the area of the element or layer that has passed through the crush front or barrier or as a function of the distance that said element or layer has passed through the crush front or barrier.

5. A method as claimed in claim 4 wherein said first percentage is the percentage of the area of the element or layer that has passed through the crush front or barrier or the percentage of the length of the element or layer normal to the crush front or barrier that has passed through the crush front or barrier.

6. A method as claimed in claim 1 comprising determining whether the element or layer is failing by said crush failure mode by determining whether an impactor barrier has physically encroached into a space allocated to said element or layer.

7. A method as claimed in claim 1 comprising determining whether the element or layer is failing by said crush failure mode by calculating the stress or strain on the element or layer and comparing said stress or strain with a threshold failure value.

8. A method as claimed in claim 1 comprising defining a crush front or barrier and determining said ongoing resistance as a function of a thickness of the element or layer being crushed along the crush front or barrier.

9. A method as claimed in claim 1 comprising defining a crush front or barrier and determining said ongoing resistance as a function of an area of contact at the crush front or barrier.

10. A method as claimed in claim 9 wherein for a given element said ongoing resistance has an actual value which is a constant function of the area of contact.

11. A method as claimed in claim 10 comprising defining said ongoing resistance force as being directly proportional to the area of contact.

12. A method as claimed in claim 1 wherein said crushable material is a composite material having a plurality of layers, the method comprising determining said resistance as a function of the lay-up of said layers.

13. A method as claimed in claim 12 comprising determining said resistance as a function of the order of said layers in the composite.

14. A method as claimed in claim 1 comprising determining said ongoing resistance as a function of one or more dynamic parameters relating to the impact.

15. A method as claimed in claim 14 comprising determining said ongoing resistance as a function of a velocity and/or an angle at which said element or layer is struck.

16. A method as claimed in claim 14 comprising determining said ongoing resistance as a function of an amount of rotation imparted to the element or layer.

17. A method as claimed in claim 1 comprising the step of designating a set of finite elements of the structure as being susceptible to failure by said crush failure mode.

18. A method as claimed in claim 17 wherein said set is only a subset of all available elements.

19. A method as claimed in claim 1 further comprising carrying out finite element calculations on said element or layer in addition to assigning said ongoing resistance to said portion and using the results calculated by said finite element calculations in subsequent analysis instead of said ongoing resistance if said results indicate the element or layer is not failing by said crush failure mode.

20. A method as claimed in claim 19 comprising allocating an element a degraded crush capability for future crush analysis if the results calculated by said finite element analysis are used.

21. A method as claimed in claim 1 wherein said finite elements are shell elements.

22. A method as claimed in claim 1 wherein said finite elements are solid elements.

23. A method as claimed in claim 1 wherein said finite elements are beam elements.

24. A method as claimed in claim 1 comprising defining a crush front or barrier and adjusting a relative velocity between an impactor and said element or layer during passage of the crush front or barrier through the element.

25. A method as claimed in claim 24 comprising modifying the ongoing resistance along a length of the element in accordance with a predetermined function of the relative velocity.

26. A method as claimed in claim 1 comprising defining a crush front or barrier and adjusting an angle of impact between an impactor and said element or layer during passage of the crush front or barrier through the element.

27. A method as claimed in claim 26 comprising modifying the ongoing resistance along a length of the element in accordance with a predetermined function of the angle of impact.

28. A method as claimed in claim 1 comprising defining a crush front or barrier and specifying a friction of the element or layer with the crush front or barrier.

29. A method as claimed in claim 1 comprising specifying material damping coefficients.

30. A method as claimed in claim 1 wherein said crushable material comprises a composite material.

31. A method as claimed in claim 30 wherein said composite material is a fiber-reinforced composite material.

32. A method as claimed in claim 30 wherein said composite material is a carbon-fiber reinforced resin.

33. A method of modelling the behaviour of a structure during an impact, said structure incorporating a material which can fail through a crush failure mode whereby said material is continuously consumed in a crush direction by disintegrating into debris, the method comprising the steps of determining for one or more layers of a finite element of said material during an impact whether said element or layer thereof is failing by said crush failure mode; and if said element or layer is determined to be failing by said crush failure mode, defining a crush front or barrier and allowing the element or layer to pass through said crush front or barrier whilst being crushed, and calculating a resistance force and assigning said resistance force to said element or layer, wherein said steps of calculating and applying are carried out one or more times such that a resistance force is assigned to a portion of the structure in the crush direction as said element or layer passes through said barrier; and using said model to output data from which a predicted impact resistance of said structure can be calculated.

34. Computer software which, when executed on suitable data processing means, models the behaviour of a structure during an impact, said structure incorporating a material which can fail through a crush failure mode whereby said material is continuously consumed in a crush direction by disintegrating into debris, said software determining for one or more layers of a finite element of said material during said impact whether said element or layer thereof is failing by said crush failure mode and if said element is determined to be failing by said crush failure mode, defining a crush front or barrier and allowing the element or layer to pass through said crush front or barrier whilst being crushed, and assigning to a portion of the structure an ongoing resistance in the crush direction as the element or layer passes through the barrier, and using said model to output data from which a predicted impact resistance of said structure can be calculated.

35. Software for performing finite element modelling comprising software as claimed in claim 34.

36. Software as claimed in claim 35 wherein said finite element modelling is non-linear.

37. Software as claimed in claim 35 wherein said finite element modelling is explicit non-linear.

38. A data processing system which models the behaviour of a structure during an impact comprising:
 a computer that: (i) determines for one or more layers of a finite element of a material during said impact whether said element or layer thereof is failing by a crush failure mode whereby said material is continuously consumed in a crush direction by disintegrating into debris; (ii) if said element is determined to be failing by said crush failure mode pursuant to (i) above, said computer defines a crush front or barrier and allows the element or layer to pass through said crush front or barrier whilst being crushed, and assigns to a portion of said structure an ongoing resistance in the crush direction as the element or layer passes through the barrier; and (iii) using said model to output data from which a predicted impact resistance of said structure can be calculated.

39. A method of modelling the behaviour of a structure during an impact, said structure incorporating a material which can fail through a crush failure mode whereby said material is continuously consumed in a crush direction by disintegrating into debris, the method comprising the steps of using a computer to determine for one or more layers of a finite element of said material during said impact whether said element or layer thereof is failing by said crush failure mode; and if said element or layer is determined to be failing by said crush failure mode, defining a crush front or barrier and allowing the element or layer to pass through said crush front or barrier whilst being crushed, and assigning to a portion of the structure an ongoing resistance in the crush direction as the element or layer passes through the barrier, and outputting data from which the predicted impact resistance of said structure can be calculated.

* * * * *